United States Patent
Jarrige et al.

(10) Patent No.: US 12,401,305 B2
(45) Date of Patent: Aug. 26, 2025

(54) MOTOR MANAGEMENT DEVICE AND MOTOR START-UP AND PROTECTION SYSTEM COMPRISING SUCH A MOTOR MANAGEMENT DEVICE

(71) Applicant: Schneider Electric Industries SAS, Rueil Malmaison (FR)

(72) Inventors: Christian Jarrige, Saint Aupre (FR); Stéphane Delbaere, Meylan (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 83 days.

(21) Appl. No.: 18/370,977

(22) Filed: Sep. 21, 2023

(65) Prior Publication Data
US 2024/0113647 A1  Apr. 4, 2024

(30) Foreign Application Priority Data
Sep. 29, 2022 (FR) ...................................... 2209884

(51) Int. Cl.
*H02P 23/14* (2006.01)
*H02H 7/08* (2006.01)

(52) U.S. Cl.
CPC ........... *H02P 23/14* (2013.01); *H02H 7/0833* (2013.01)

(58) Field of Classification Search
CPC ...... H02P 23/14; H02P 29/027; H02P 29/032; H02P 25/18; H02H 7/0833; H02H 7/085; H02H 7/08
(Continued)

(56) References Cited

U.S. PATENT DOCUMENTS 6,650,245 B2 * 11/2003 Chung .................. H01H 9/542
                                                              340/657
9,124,210 B2 *  9/2015 Yamamoto ............ H02P 29/025
(Continued)

FOREIGN PATENT DOCUMENTS

EP      2293426 A1    3/2011
EP      3267462 A1    1/2018
(Continued)

OTHER PUBLICATIONS

French Search Report and Written Opinion dated Mar. 15, 2023 for corresponding French Patent Application No. FR2209884, 7 pages.

*Primary Examiner* — David Luo
(74) *Attorney, Agent, or Firm* — Troutman Pepper Locke LLP (57) ABSTRACT

A motor management device controls the supply of electrical power to a motor by controlling at least one switching member. To be more easily adaptable, the device includes a platform and a modular connector which is separate from the platform. The platform bears an electronic unit including a power supply module controlling the switching member, a monitoring module intended to detect a fault of the motor, a protection module that disconnects the power supply in the event of a fault and a control module that controls the power supply module. The modular connector includes interchangeable connection elements, and includes at least as many connection elements of control output type as the device controls switching members, each connection element connecting a switching member to the power supply module, as well as a connection element of state output type connected to the monitoring module and providing an item of fault information when the monitoring module detects a fault of the electric motor.

10 Claims, 4 Drawing Sheets

(58) Field of Classification Search
USPC ................. 318/445, 400.21, 400.01, 700
See application file for complete search history.

(56) References Cited

U.S. PATENT DOCUMENTS

| | | | | |
|---|---|---|---|---|
| 9,780,699 | B2 * | 10/2017 | Kim | .................. H02P 1/04 |
| 2016/0181866 | A1 | 6/2016 | Moeskops | |
| 2018/0014412 | A1 | 1/2018 | Comtois et al. | |
| 2022/0051864 | A1 | 2/2022 | Daoura et al. | |

FOREIGN PATENT DOCUMENTS

| | | | |
|---|---|---|---|
| GB | 2565343 | A | 2/2019 |
| WO | 2015022329 | A1 | 2/2015 |

\* cited by examiner

MOTOR MANAGEMENT DEVICE AND MOTOR START-UP AND PROTECTION SYSTEM COMPRISING SUCH A MOTOR MANAGEMENT DEVICE

TECHNICAL FIELD

The present invention relates to a motor management device and to a motor start-up and protection system comprising such a motor management device.

BACKGROUND

In the field of control of start-up of electric motors, it is known to use a protecting member, such as a circuit breaker, and a switching member, such as a contactor, to protect and manage the start-up of an electric motor. It is also known to use a motor management device, connected to the protecting member, to the switching member and to the electric motor, to drive the switching member and to monitor the operation of the electric motor.

It is known to adapt this type of motor management device to each application, because there are many different use cases requiring integration of various functions into the motor management device.

For example, depending on the desired method of start-up of the electric motor, it is known to use more than one switching member, for example two switching members making it possible to choose the direction of rotation of the electric motor, or indeed three switching members arranged in a star-delta configuration to make a gradual start-up of the electric motor possible. The outputs of the motor management device must thus be adapted depending on the number of switching members to be driven.

It is also known to add various inputs-outputs to the motor management device, making it possible, for example, to provide an item of fault information, to learn the state of the protecting member, to receive or supply digital data, or else to supply an auxiliary voltage to accessories.

Thus, this type of motor management device must be adapted for each use case, in order to facilitate its implementation within a motor start-up and protection system. This adaptation has the drawback of being expensive and complex to implement.

SUMMARY

It is these drawbacks that the invention more particularly intends to overcome by providing a motor management device that is simple to adapt, while being economical to manufacture.

To this end, the invention relates to a motor management device, configured to control the supply of electrical power to an electric motor by controlling at least one switching member, by supplying control power to a control element of each switching member.

According to the invention, the motor management device comprises:
 a platform, bearing an electronic unit, the electronic unit comprising:
  a power supply module, configured to supply control power to a control element of each switching member,
  a monitoring module, configured to measure the current of each phase of the electrical power supply of the electric motor and to detect a fault of the electric motor;
  a protection module, configured to disconnect the power supply of the power supply module when the monitoring module detects an electrical fault of the electric motor; and
  a control module, configured to control the power supply module based on the current measurement performed by the monitoring module and based on control instructions received by the motor management device, and
 a modular connector which is separate from the platform, comprising interchangeable connection elements and comprising at least the following connection elements:
  at least one connection element of control output type, the modular connector being configured to comprise as many connection elements of control output type as the motor management device controls switching members, each connection element of control output type being configured to connect the control element of a switching member to the power supply module, and
  a connection element of state output type, connected to the monitoring module and configured to provide an item of fault information when the monitoring module detects a fault of the electric motor.

The control module further controls the power supply module depending on the connection elements that the modular connector comprises.

By virtue of the invention, the motor management device comprises a platform which is common to all use cases and a modular connector making it possible to easily adapt the connection interface of the motor management device to each use case, by adding thereto the connection elements necessary for a given use case.

According to some advantageous but non-mandatory aspects of the invention, the motor management device incorporates one or more of the following features, either alone or in any technically permissible combination:

The modular connector comprises at least two connection element receiving locations, each location being able to accommodate all the types of connection elements.
 The electronic unit further comprises an identification module, connected to the modular connector, the identification module automatically identifying the number of connection elements that the modular connector comprises and the type of each connection element, and the control module controls the power supply module depending on the number and type of the connection elements that the modular connector comprises.
 Each connection element of the modular connector comprises electronic components for connecting the connection element to the electronic unit of the platform and the identification module automatically identifies the type of each connection element based on the electronic components of the connection elements.
 The platform further comprises a communication module, configured to receive control instructions from an industrial computer, and to transmit operating information from the motor management device to the industrial computer, and the control module controls the power supply module based on the control instructions received by the communication module.
 The motor management device is configured to be connected to a member for protecting the electric motor so as to obtain an item of information on the state of the protecting member, the control module is further configured to control the power supply module based on the item of information on the state of the protecting member, and the modular connector further comprises a connection element of state input type, configured to connect the protecting member to the control module.

The modular connector further comprises a connection element of digital output type, configured to connect the control module to a digital control element of a switching member, and the control module is configured to provide a digital control signal to the digital control element via the connection element of digital output type.

The platform further comprises an auxiliary supply module, configured to be connected to an auxiliary power source and to supply auxiliary current to the motor management device, and, preferably, the modular connector further comprises a connection element of auxiliary supply output type, configured to connect the auxiliary supply module to an auxiliary electrical load external to the motor management device.

The platform further comprises an emergency stop module, connected to an emergency stop button, and the emergency stop module disconnects the power supply of the power supply module when the emergency stop button is actuated.

According to another aspect, the invention also relates to a motor start-up and protection system, comprising a protecting member, at least one switching member, supplied with power by the protecting member, each switching member comprising a control element configured to switch the switching member between a closed state in which the switching member electrically powers an electric motor, and an open state in which the switching member does not electrically power the electric motor, and a motor management device, configured to supply control power to the control element of each switching member. According to the invention, the motor management device is such as described above.

This motor start-up and protection system results in the same advantages as those mentioned above with respect to the motor management device of the invention.

BRIEF DESCRIPTION OF THE DRAWINGS

The invention will be better understood and other advantages thereof will become more clearly apparent in light of the following description of one embodiment of a motor management device and of a motor start-up and protection system according to the principle thereof, which description is provided solely by way of example and given with reference to the appended drawings, in which.

DETAILED DESCRIPTION

Figure 1:
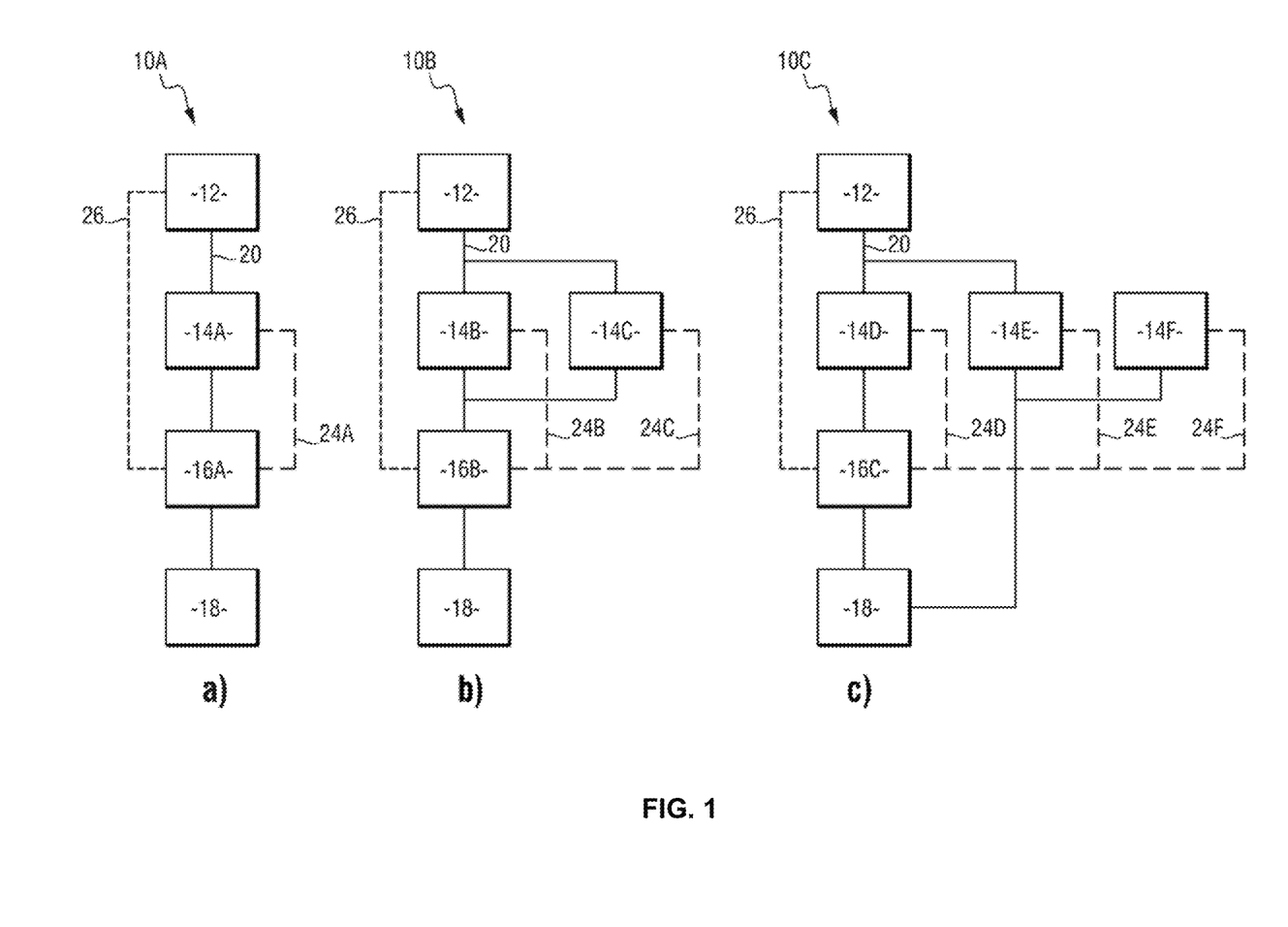
FIG. 1 shows, in three inserts a) to c), three diagrams of three embodiments of a motor start-up and protection system according to the invention, respectively.

A motor start-up and protection system 10A according to a first embodiment of the invention may be seen in insert a) of FIG. 1. The motor start-up and protection system 10A comprises a protecting member 12, such as for example a circuit breaker, a switching member 14A, such as for example a contactor, a motor management device 16A and an electric motor 18.

The protecting member 12 is connected to an electrical power source (not shown). The protecting member 12, when it is in a closed state, supplies electrical power to the switching member 14A, the motor management device 16A and the electric motor 18, this electrical power supply preferably being achieved using three-phase current. In FIG. 1, power lines 20 carrying this three-phase current have been represented by thick solid lines.

The protecting member 12 is intended to detect an electrical fault that occurs downstream, for example in the electric motor 18, and to disconnect the electrical power supply of the switching member 14A, of the motor management device 16A and of the electric motor 18 when a fault is detected, that is to say to switch to an open state.

The switching member 14A allows the electrical power supply to pass from the protecting member 12 to the electric motor 18 or it to be interrupted. In other words, the switching member 14A is switchable between an open state, in which the electric motor 18 is not supplied with electrical power and therefore stopped, and a closed state, in which the electric motor is supplied with electrical power and therefore capable of operating. The switching member 14A comprises a control element 22A allowing the switching member to be switched between its open and closed states. In practice, the control element 22A switches the switching member 14A to the closed state and keeps it therein when it is supplied with electrical power, and switches the switching member to the open state and keeps it therein when it is not supplied with electrical power. Furthermore, the electrical power supply of the control element 22A is distinct from the electrical power supply supplied by the protecting member 12. The control element 22A is, for example, an electromagnet coil of a contactor. The control element 22A is shown only in FIG. 2. For the sake of simplicity, in FIG. 2 the control element 22A has been shown separate from the switching member 14A, even though the control element is in fact integrated into the switching member.

The motor management device 16A allows the control element 22A of the switching member 14A to be controlled. In other words, the motor management device 16A controls the operation of the electric motor 18, by determining whether or not the electric motor is supplied with electrical power. Thus, the motor management device 16A is connected to the switching member 14A via an electrical line 24A that supplies or does not supply control power to the control element 22A of the switching member. In FIG. 1, an electrical line 24A carrying this control power has been represented by a dashed line the dashes of which are long.

The motor management device 16A is also connected to the protecting member 12, so as to receive an item of information on the state of the protecting member 12. In other words, this connection allows the motor management device 16A to learn whether the protecting member 12 is in the open or closed state. This connection is achieved via a data line 26, which has been represented in FIG. 1 by a dashed line the dashes of which are short.

In practice, the protecting member 12, the switching member 14A and the motor management device 16A are either integrated into a control-command drawer mounted in a control-command cabinet, or integrated into an electrical box or an electrical cabinet.

The motor management device 16A is described in more detail with reference to FIG. 2.

The motor management device 16A comprises a platform 28 and a modular connector 30 which is separate from the platform. Advantageously, the modular connector 30 is fastened to the platform 28. In other words, the modular connector and the platform are assembled together to form the motor management device.

The platform 28 bears an electronic unit 32, which performs the main functions of the motor management device 16A, and the modular connector 30 groups together the input-output connection elements of the motor management device 16A.

The electronic unit 32 comprises a control module 34, which controls the operations of the platform 28. Thus, the control module 34 determines whether or not the motor management device 16A supplies control power to the control element 22A of the switching member 14A.

Preferably, the modular connector 30 comprises a connection element of state input type 36, configured to connect the protecting member 12 to the control module 34. Thus, by virtue of the connection element of state input type 36, the control module 34 collects the item of information on the state of the protecting member 12. In practice, the presence of the connection element of state input type 36 is optional: connection between the protecting member 12 and the control module 34 is advantageous, but not essential to the operation of the control module 34.

The electronic unit 32 comprises a power supply module 38, which supplies control power to the control element 22A via the electrical line 24A. In other words, the switching member 14A is in its closed state when the power supply module supplies control power to the control element 22A and is in its open state when the power supply module does not supply control power. In practice, the control module 34 controls the power supply module 38.

The modular connector 30 comprises a connection element of control output type 40. In practice, the modular connector 30 comprises as many connection elements of control output type 40 as the motor start-up and protection system 10A comprises switching members, that is to say one in the example of the first embodiment. Each connection element of control output type 40 connects the control element 22A of the switching member 22 to the power supply module 38. In other words, the control power supplied by the power supply module 38 passes through the connection elements of control output type 40.

As a variant (not shown) of the invention, the control power is not supplied to the control element 22A by the power supply module 38, but by an electrical circuit (not shown), and the connection element of control output type 40 comprises an electromechanical relay, controlled by the power supply module, which opens or closes the electrical circuit supplying control power to the control element.

The electronic unit 32 comprises a monitoring module 42 that measures the current of each phase of the electrical power supply of the electric motor 18 passing through the power line 20. This current measurement is carried out by means of current sensors 44 connected to the monitoring module 42. Based on analysis of this current measurement, the monitoring module 42 detects the occurrence of a fault of the electric motor 18, such as an overload for example.

Optionally, the monitoring module 42 also measures the voltage of each phase of the electrical power supply of the electric motor 18 passing through the power line 20, by means of voltage sensors (not shown). By virtue of this voltage measurement, the monitoring module 42 computes the electrical power consumed by the electric motor 18, this being advantageous in respect of monitoring the operation of the electric motor In FIG. 2, the power line 20 has been shown passing through the motor management device 16A. As a variant (not shown) of the invention, the power line 20 does not pass through the motor management device 16A and the current sensors 44 are remote from the motor management device.

The electronic unit 32 comprises a protection module 46, which is configured to disconnect the power supply of the power supply module 38 when the monitoring module 42 detects an electrical fault of the electric motor 18. This disconnection of the power supply of the power supply module 38 results in the end of the transmission, by the power supply module, of the control power to the control element 22A, this causing the switching member 14 to switch to the open state. Thus, when the monitoring module 42 detects an electrical fault of the electric motor 18, the electrical power supply of the electric motor is disconnected by the protection module 46.

The modular connector 30 comprises a connection element of state output type 48, connected to the monitoring module 42 and providing an item of fault information when the monitoring module 42 detects a fault of the electric motor. In the example, the connection element of state output type 48 comprises an electromechanical relay 50 and is connected to an electronic circuit comprising a light source 52 so that, when a fault of the electric motor is detected by the monitoring module 42, a command is sent by the control module 34 so as to cause the electromechanical relay 50 to be activated and the light source 52 to be turned on. Here, the item of fault information is thus a command sent to the electromechanical relay 50 that causes the emission of luminous information. As a variant (not shown) of the invention, the connection element of state output type 48 provides another type of fault information, such as an audio signal, a control signal, or a computer message.

The monitoring module 42 therefore preferably causes the power supply of the power supply module 38 to be disconnected by the protection module 46, and an item of fault information to be transmitted via the connection element of state output type 48. An item of fault information may be transmitted prior to disconnection of the power supply of the power supply module, for example when the detected fault is not major enough to justify this disconnection, or indeed simultaneously with disconnection of the power supply, or even after disconnection of the power supply.

Preferably, the platform 28 of the motor management device 16A comprises a communication module 54, which receives control instructions from an industrial computer (not shown) and supplies this information to the control module 34.

Preferably, the communication module 54 further transmits operating information from the motor management device 16A to the industrial computer. Advantageously, the control module 34 controls the power supply module 38 based on the control instructions received by the communication module 54.

Figure 2:
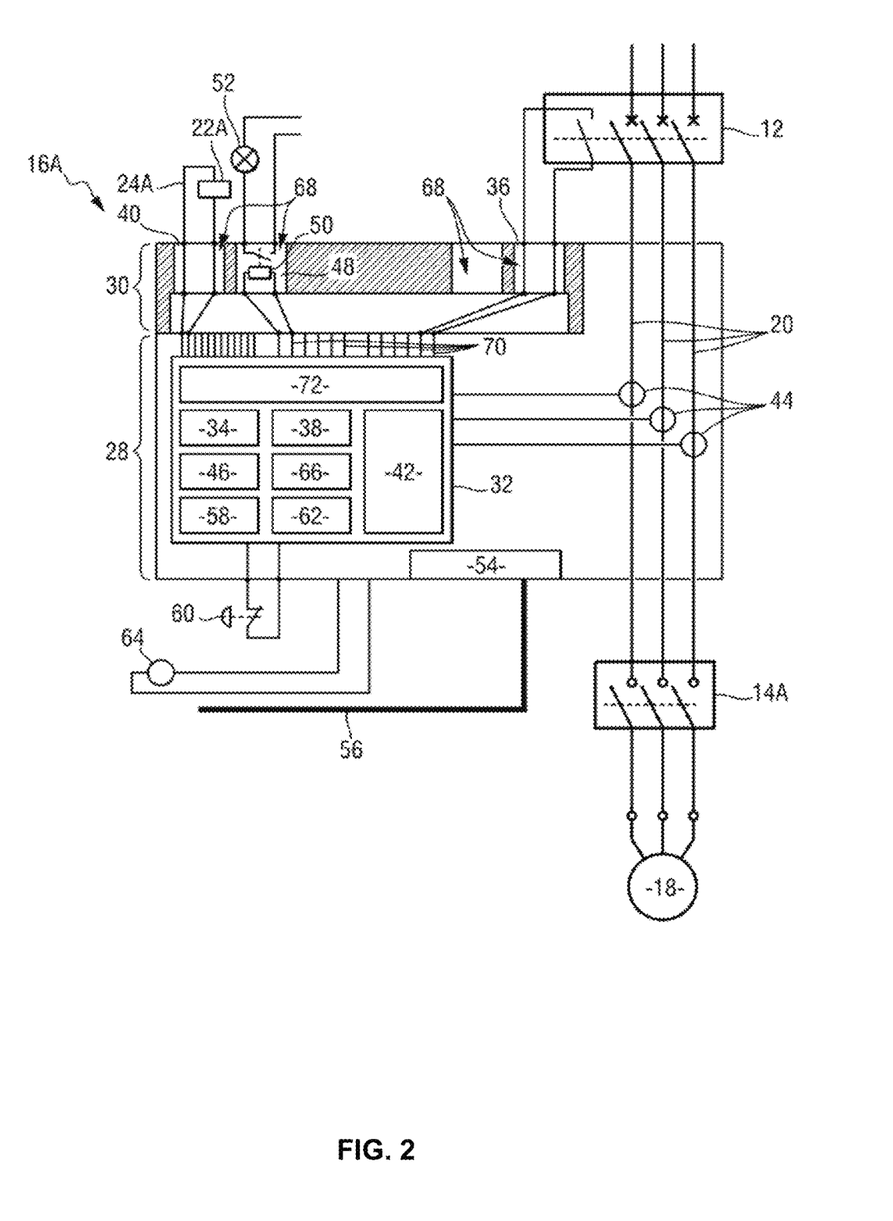
FIG. 2 is a schematic view of the motor start-up and protection system of insert a) of FIG. 1.

In FIG. 2, the communication module 54 has been shown separate from the electronic unit 32. As a variant (not shown) of the invention, this communication module is integrated into the electronic unit 32.

In the example, the communication module 54 and the industrial computer exchange via a data bus 56. As a variant (not shown) of the invention, this exchange is achieved via other means, such as, for example, an analogue link or indeed a wireless link such as a radio or Wi-Fi link.

Preferably, the electronic unit 32 comprises an emergency stop module 58, connected to an emergency stop button 60.

In the example, the emergency stop button 60 is remote from the motor management device 16A. For example, the emergency stop button is located in proximity to the electric motor 18. As a variant (not shown) of the invention, the emergency stop button 60 is fastened to the platform 28. When the emergency stop button 60 is actuated by a user, the emergency stop module 58 interrupts the power supply of the power supply module 38, and therefore of the control output 40, this causing the switching member 14A to switch to the open state, and therefore the electric motor 18 to stop.

Preferably, the electronic unit 32 comprises an auxiliary supply module 62, which is supplied with auxiliary current by an auxiliary power source 64 that is external to the motor management device 16A. For the sake of simplicity, the physical link between the auxiliary supply module 62 and the auxiliary power source 64 has not been shown inside the platform 28 in FIG. 2. The auxiliary supply module 62 supplies the motor management device 16A with auxiliary current, this being an operating supply of the motor management device 16A. Thus, by virtue of the auxiliary supply module 62 and of the auxiliary power source 64, the motor management device 16A is constantly supplied with electrical power, including when the protecting member 12 is in the open state and does not supply electrical power to the motor management device 16A. Constant operation of the motor management device 16A is therefore ensured.

Preferably, the modular connector 30 comprises a connection element of auxiliary supply output type (not shown) that is connected to the auxiliary supply module 62. The connection element of auxiliary supply output type is intended to be connected to an auxiliary electrical load and to supply this auxiliary electrical load with the auxiliary current, the auxiliary electrical load being external to the motor management device 16A. The connection element of auxiliary supply output type for example takes the form of an electrical socket intended to receive a male electrical plug. Thus, by virtue of the connection element of auxiliary supply output type, it is possible to supply an auxiliary electrical load even when the protecting member 12 is in the open state. Such an auxiliary electrical load is, for example, a sensor requiring a constant electrical power supply.

Preferably, the modular connector 30 comprises a connection element of digital input type (not shown) that is connected to the communication module 54 via the electronic unit 32 or that is directly connected to the control module 34. The connection element of digital input type is connected to a digital communication system, such as a bus for example. This connection for example employs the Ethernet protocol. The connection element of digital input type is advantageous as it allows the platform 28 to receive digital data from an apparatus external to the motor management device 16A, without requiring the data bus 56 to be used, or in parallel with use of the data bus 56. For example, the connection element of digital input type is intended to receive digital data from the electric motor 18, this data then being used by the control module 34 and/or transmitted to the industrial computer by the communication module 54. As a variant (not shown) of the invention, the control element 22A of the switching member 14A is a control element of digital type, which does not switch the switching member between its open and closed states based on supply of control power, but rather based on a digital control signal. In such a variant, the modular connector 30 comprises a connection element of digital output type (not shown) that is connected on the one hand to the control module 34 and on the other hand to the control element 22A. Thus, the control module 34 supplies a digital control signal to the control element 22A via the connection element of digital output type. Preferably, in such a variant, the electronic unit 32 comprises a digital control module, connected on the one hand to the control module 34 and on the other hand to the connection element of digital output type. This digital control module transmits the digital control signal supplied to the control element 22A via the connection element of digital type, transmission of this digital control signal being controlled by the control module 34.

Preferably, the electronic unit 32 comprises a diagnostic module 66 that is connected to the control module 34, to the power supply module 38 and to the monitoring module 42. The diagnostic module 66 analyses the control power supplied by the control module 34 to the connection element of control output type 40 and the current measurements taken by the sensors 44, to analyse the state of health of the switching member 14A and of its control element 22A. For example, if the current flowing through the power line 20 is high, then the switching member 14A is thermally stressed, this decreasing its lifespan. Analysis of the current flowing through the control element 22A also provides information on the state of health of the switching member 14A. The analysis of the state of health of the switching member 14A carried out by the diagnostic module 66 is supplied to the control module 34, so that the operation of the motor management device 16A may be adapted, especially when a failure of the switching member 14A is detected or anticipated.

Advantageously, the modular connector 30 comprises a plurality of connection element receiving locations 68, in this example four connection element receiving locations 68. Among these four locations, a first receives the connection element of control output type 40, a second receives the connection element of state output type 48, a third is not used and a fourth receives the connection element of state input type 36. The modular connector 30 is said to be modular because each connection element receiving location 68 is able to accommodate all the types of connection elements, namely a connection element of state input type 36, a connection element of control output type 40, a connection element of state output type 48, a connection element of auxiliary supply output type, a connection element of digital input type or a connection element of digital output type.

The connection elements are therefore interchangeable within the connection element receiving locations 68.

As a variant (not shown) of the invention, the modular connector comprises a number of connection element receiving locations 68 other than four, for example six or eight locations.

Each connection element receiving location 68 is connected to the platform 28, and more precisely to the electronic unit 32, by a set of electrical connectors 70, which are shown schematically in FIG. 2. The electrical connectors 70 are, for example, pins. Connection of a connection element to the electronic unit 32 is achieved via the electrical connectors 70.

In practice, a high number of electrical connectors 70 open into each connection element receiving location 68, for example between 10 and 30 electrical connectors 70, and preferably 20 electrical connectors, and a connection element of a given type uses only some of these electrical connectors 70 to be connected to the electronic unit 32, for example two or three electrical connectors, the electrical connectors used depending on the type of the connection element. Thus, from the electrical connectors 70 used to connect a connection element to the electronic unit 32, it is possible to identify the type of the connection element.

By way of example, the connection element of control output type 40 is connected to electrical connectors 70 that are directly connected to the power supply module 38, so that these electrical connectors 70 may supply control power to the connection element of control output type 40.

In order to identify the type of each connection element and the number of connection elements of the modular connector 30, the electronic unit 32 comprises an identification module 72 which is interposed between the other modules of the electronic unit 32 and the electrical connectors 70. In other words, all the electrical connectors 70 are connected to the identification module 72. Thus, the identification module 72 is connected to the modular connector 30. The identification module 72 automatically identifies the number of connection elements that the modular connector 30 comprises and the type of each connection element, and shares this information with the control module 34.

Thus, the control module 34 controls the modules of the electronic unit 32 based on the number and type of connection elements that the modular connector 30 comprises. For example, the control module 34 controls the power supply module 38 based on the current measurement taken by the monitoring module 42, based on the item of information on the state of the protection device 12, based on control instructions received by the motor management device 16A and based on the number of connection elements of control output type 40 that the modular connector 30 comprises.

In practice, each connection element comprises electronic components for connecting the connection element to the electrical connectors 70, and therefore to the platform 32. The electronic components that a connection element comprises depend on the type of the connection element, so that a connection element of a given type is connected, by these electronic components, to specific electrical connectors 70. These electronic components are, for example, plugs into which electrical connectors 70 are plugged. Thus, the identification module 72 is able to identify the type of a connection element based on the electronic components that this connection element comprises. The identification module 72 is either formed by means of a physical element of the electronic unit 32, for example by means of a microcontroller connected to the electrical connectors 70, or formed virtually, that is to say the identification function of the identification module 72 is obtained by means of a function executed by the control module 34.

In other words, the identification module 72, and therefore the motor management device 16A, is able to learn the number and type of the connection elements that the modular connector 30 comprises through simple connection of the modular connector to the platform 28. Advantageously, the operation of the motor management device 16A is thus adapted, or customized, depending on the number and type of the connection elements of the modular connector 30, without requiring any additional configuration of the motor management device.

For example, if it is detected that a connection element of state output type 48 is present in the modular connector 30, then the control module 34 instructs the monitoring module 42 to provide an item of fault information to the connection element of state output type in the event of an electrical fault of the electric motor 18.

According to another example, if it is detected that a connection element of digital input type is present in the modular connector 30, then the communication module 54 monitors the arrival of digital data via the connection element of digital input type, in order to transmit this data to the industrial computer and/or to the control module 34 so that the control module may adapt the operation of the motor management device 16A depending on these data.

As a variant (not shown) of the invention, the electronic unit 32 does not comprise an identification module 72 and each connection element bears an electronic identification component indicating to the control module 34 the type of the connection element. In other words, in such a variant, the control module 34 identifies the number and type of the connection elements that the modular connector 30 comprises based on the identification information provided by each of the connection elements.

A motor start-up and protection system 10B according to a second embodiment of the invention may be seen in insert b) of FIG. 1. The motor start-up and protection system 10B comprises a protecting member 12, identical to that of the first embodiment, two switching members 14B and 14C, a motor management device 16B, more clearly shown in FIG. 3, and an electric motor 18, identical to that of the first embodiment.

In the second embodiment, elements that are analogous to those of the first embodiment have been designated by the same references and operate in the same way. In what follows, mainly the differences between the first and second embodiments are described.

Figure 3:
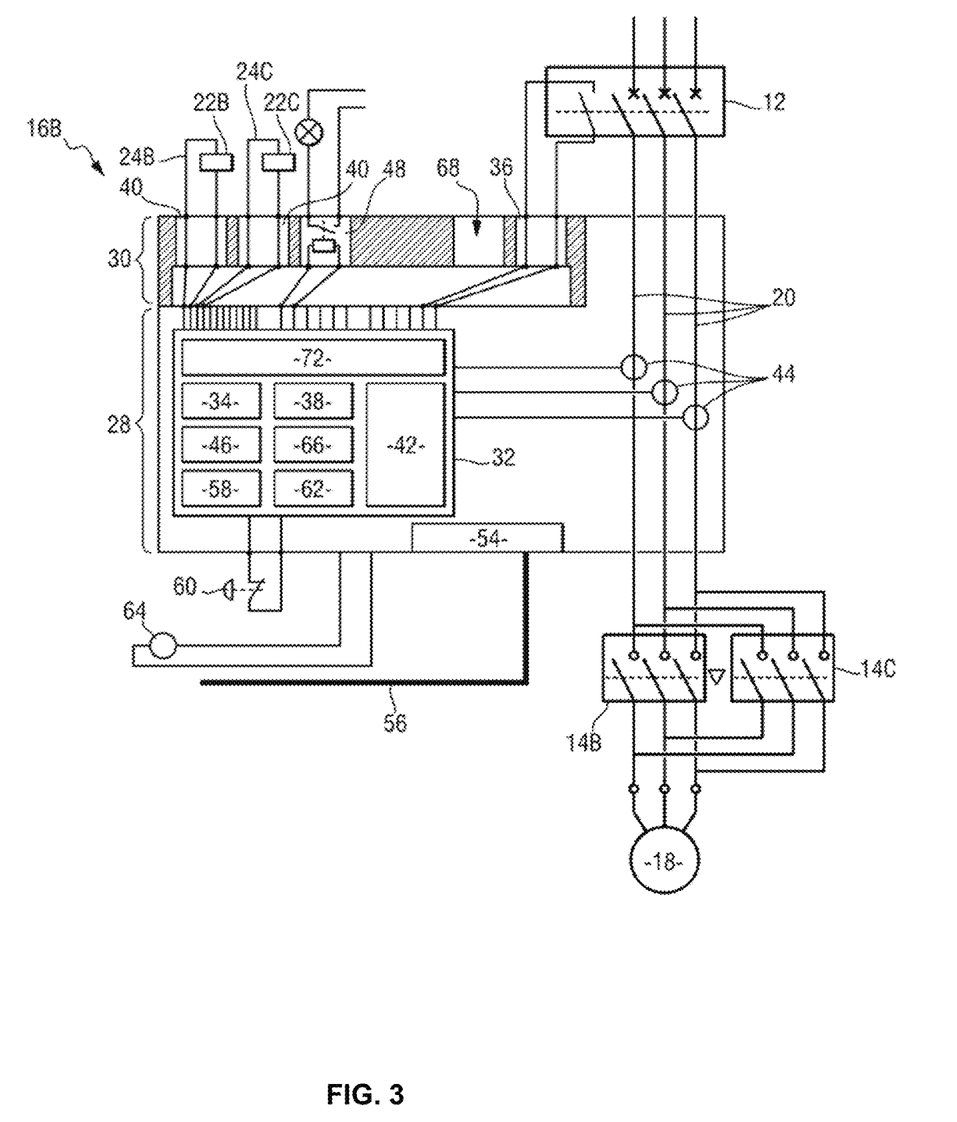
FIG. 3 is a schematic view of the motor start-up and protection system of insert b) of FIG. 1.

Furthermore, if a component is mentioned in the description of the second embodiment without being shown in FIG. 3, it corresponds to the same element shown in FIG. 2 in respect of the first embodiment.

The switching members 14B and 14C operate just like the switching member 14A of the first embodiment, that is to say that each makes it possible to let electrical power pass from the protecting member 12 to the electric motor 18 or interrupt it and comprises a control element, denoted 22B and 22C, respectively.

The protecting member 12 supplies electrical power to the two switching members 14B and 14C, to the motor management device 16B and to the electric motor 18.

The operation of the motor start-up and protection system 10B differs from that of the first embodiment in that the motor management device 16B, which controls the control elements 22B and 22C, determines via which switching member 14B or 14C the electric motor 18 is supplied. In other words, the motor management device 16B chooses either to open switching member 14C and to close switching member 14B, in order to supply the electric motor 18 via switching member 14B, or to open switching member 14B and to close switching member 14C, in order to supply the electric motor 18 via switching member 14C, or to open both switching members 14A and 14C, so that the electric motor is not supplied with power.

Furthermore, the power line 20 is passed in parallel through the switching members 14B and 14C, such that the direction of rotation of the electric motor 18 differs depending on the switching member supplying the electric motor. Thus, when switching member 14B is closed, the electric motor rotates in a first direction, and when switching member 14C is closed, the electric motor rotates in a second direction, opposite the first direction. The electric motor 18 is thus connected in the so-called "inverter" mode.

It will thus be understood that, in the second embodiment, the motor management device 16B controls two control elements 22B, 22C and therefore that the modular connector 30 comprises two connection elements of control output type 40, among which a first is connected on the one hand to the power supply module 38 and on the other hand to the control element 22B of the switching member 14B, via an electrical line 24B, and a second is connected on the one hand to the power supply module 38 and on the other hand to the control element 22C of the switching member 14C, via an electrical line 24C. In other words, the modular connector 30 comprises as many connection elements of control output type 40 as the motor start-up and protection system comprises switching members.

Thus, the motor management device 16B of the second embodiment differs from the motor management device 16A of the first embodiment solely in the connection elements that the modular connector 30 comprises. In other words, the platform 28 of the motor management device 16B is identical to the platform 28 of the motor management device 16A.

As a variant, in the second embodiment, the electric motor 18 rotates in the same direction regardless of the closed switching member 14B, 14C, but rotates at a different speed depending on the closed switching member.

A motor start-up and protection system 10C according to a third embodiment of the invention may be seen in insert c) of FIG. 1. The motor start-up and protection system 10C comprises a protecting member 12, identical to that of the first embodiment, three switching members 14D, 14E and 14F, a motor management device 16C, more clearly shown in FIG. 4, and an electric motor 18, identical to that of the first embodiment.

In the third embodiment, elements that are analogous to those of the first and second embodiments have been designated by the same references and operate in the same way. In what follows, mainly the differences between the third embodiment and the preceding embodiments are described.

Figure 4:
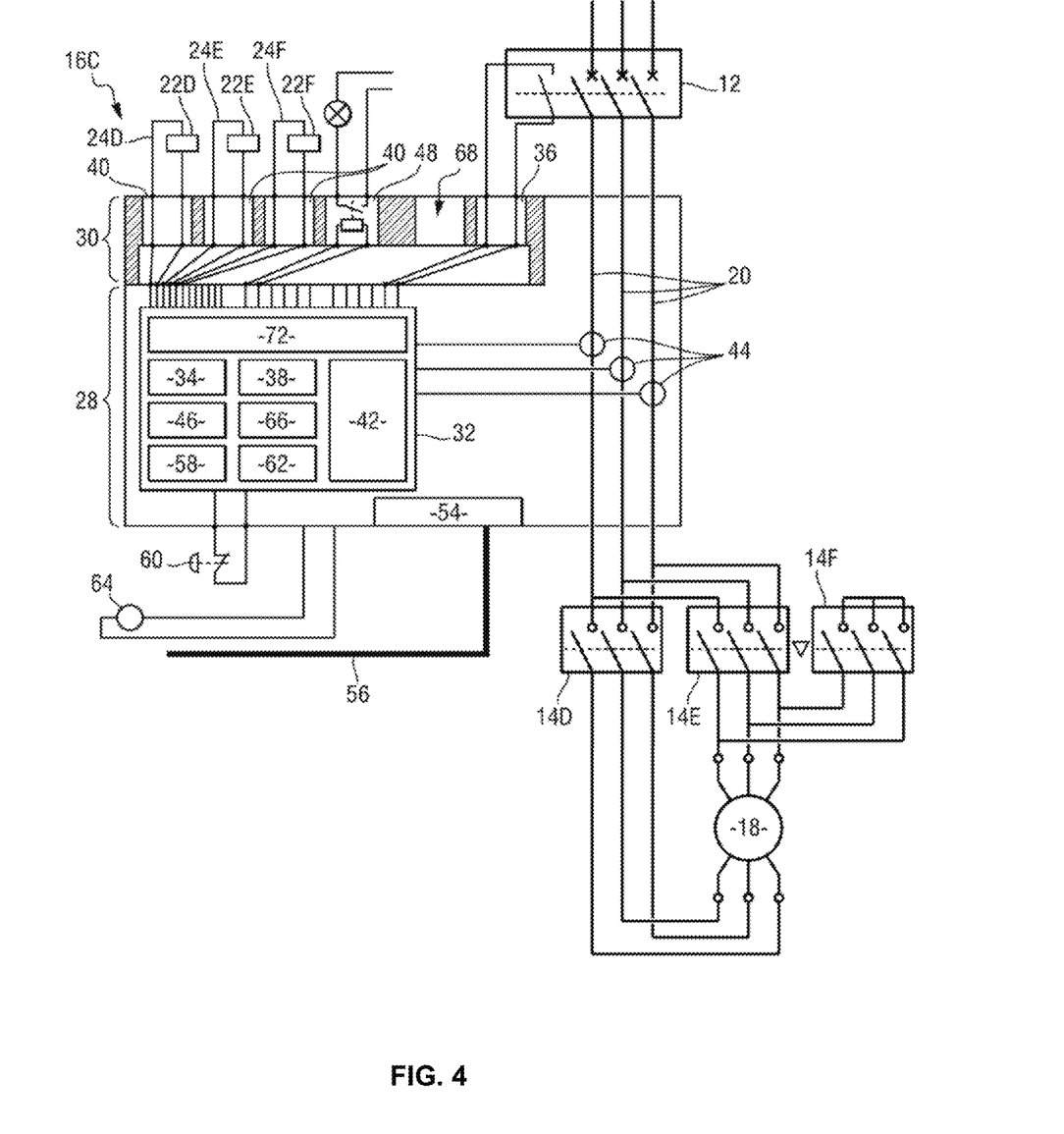
FIG. 4 is a schematic view of the motor start-up and protection system of insert c) of FIG. 1.

Furthermore, if a component is mentioned in the description of the third embodiment without being shown in FIG. 4, it corresponds to the same element shown in FIGS. 2 and 3 in respect of the first and second embodiments.

The protecting member 12 supplies electrical power to the three switching members 14D, 14E and 14F, to the motor management device 16B and to the electric motor 18.

The power supply line 20 and the switching members 14D, 14E and 14F are connected to the protecting member 12 and to the electric motor 18 in a so-called "star-delta" arrangement, known per se. In this arrangement, the electric motor 18 is powered either in a first configuration in which the switching member 14D and the switching member 14E are in the closed state, the switching member 14F then being in the open state, or in a second configuration in which the switching member 14D and the switching member 14F are in the closed state, the switching member 14E then being in the open state. The switching members 14D, 14E and 14F are connected to one another and to the electric motor 18, so that the supply voltage of the electric motor is different in the first configuration and in the second configuration.

The switching members 14D, 14E and 14F each comprise a control element, denoted 22D, 22E and 22F, respectively.

The operation of the motor start-up and protection system 10C differs from that of the first embodiment in that the motor management device 16C, which controls the control elements 22D, 22E and 22F, determines with which format of the switching members the electric motor 18 is supplied with power. In other words, the motor management device 16C chooses either to open switching member 14F and to close switching members 14D and 14E, or to open switching member 14E and to close switching members 14D and 14F, or to open all three switching members 14D, 14E and 14F, so that the electric motor is not supplied with power.

It will thus be understood that, in the third embodiment, the motor management device 16C controls three control elements 22D, 22E and 22F and therefore that the modular connector 30 comprises three connection elements of control output type 40, among which a first is connected on the one hand to the power supply module 38 and on the other hand to the control element 22D of the switching member 14D, via an electrical line 24D, a second is connected on the one hand to the power supply module 38 and on the other hand to the control element 22E of the switching member 14E, via an electrical line 24E, and a third is connected on the one hand to the power supply module 38 and on the other hand to the control element 22F of the switching member 14F, via an electrical line 24F.

Thus, the motor management device 16C of the third embodiment differs from the motor management devices 16A and 16B of the first and second embodiments solely in the connection elements that the modular connector 30 comprises. In other words, the platform 28 of the motor management device 16C is identical to the platform 28 of the motor management devices 16A and 16B.

It will be understood from the description of the three embodiments of the motor management device 16A, 16B and 16C that the operation of the power supply module 38 depends on the number of connection elements of control output type 40 present in the modular connector 30, since this number of connection elements depends on the number of switching members needing to be controlled by the motor management device. It is advantageous for the number of connection elements of control output type 40 to be automatically detected by the electronic unit 32, without any intervention by a user being required, because the operation of the motor management device 16A, 16B, 16C is thus automatically adapted to the motor start-up and protection system 10A, 10B, 10C into which it is integrated.

Generally, it is possible to obtain a motor management device adapted to each application by using the platform 28 such as described above and a modular connector 30 comprising any desirable configuration of connection elements among those of state input type 36, control output type 40, state output type 48, auxiliary supply output type, digital input type, and digital output type. In other words, whatever the configuration of a given motor start-up and protection system, the motor management device of this system is adapted simply by choosing the connection elements of the modular connector, an identical platform 28 being used, the operation of the motor management device being adapted depending on the connection elements present, especially by virtue of the identification module 72. In other words, the motor start-up topology required for a given motor start-up and protection system is automatically detected depending on the connection elements of the modular connector 30. Thus, it is particularly simple to adapt the motor management device to each use case, neither intervention by a user nor manual configuration of the platform 28 being required.

Furthermore, the fact that the platform 28 remains the same regardless of the use case of the motor management device is particularly advantageous in that it allows the manufacturing cost of the platform to be decreased, by virtue of mass production.

It is also particularly advantageous for the motor management device 16A, 16B, 16C to comprise a platform 28 and a modular connector 30 separate from the platform, because in the event of a failure of the platform 28, it is easy to replace the failed platform with another identical platform and to connect the modular connector to the new platform. Replacement of a failed platform is thus particularly simple.

Specifically, since the original modular connector 30 is retained and since all the connections to the connection elements are made in the modular connector 30, this replacement requires very few wiring operations. In practice, this replacement requires only connection of the current sensors 44 to the power line 20 and possibly of the emergency stop button 60 and of the voltage generator 64, but does not require any wiring relative to the control of the switching members, since this wiring is contained in the modular connector 30 which is able to be reused.

In summary, to allow easy implementation of a motor management device within a motor start-up and protection system, a platform 28 common to all the use cases and a range of connection elements of the various types described above are provided. Furthermore, other types of connection elements, not described here, are usable in the modular connector 30, depending on the specific needs of each motor start-up and protection system.

Any feature described in respect of one embodiment or variant in the foregoing may be implemented in the other embodiments and variants described above, insofar as technically feasible.

The invention claimed is:

1. A motor management device, configured to control the supply of electrical power to an electric motor by controlling at least one switching member, by supplying control power to a control element of each switching member, wherein the control power is distinct from the electrical power, the motor management device comprising:
   a platform, bearing an electronic unit, the electronic unit comprising:
      a power supply module, configured to supply the control power to a control element of each switching member;
      a monitoring module, configured to measure the current of each phase of the electrical power supply of the electric motor and to detect a fault of the electric motor;
      a protection module, configured to disconnect the power supply of the power supply module when the monitoring module detects an electrical fault of the electric motor; and
      a control module, configured to control the power supply module based on the current measurement performed by the monitoring module and based on control instructions received by the motor management device, and
   a modular connector which is separate from the platform, comprising interchangeable connection elements and comprising at least the following connection elements:
      at least one connection element of control output type, the modular connector being configured to comprise as many connection elements of control output type as the motor management device controls switching members, each connection element of control output type being configured to connect the control element of a switching member to the power supply module, and
      a connection element of state output type, connected to the monitoring module and configured to provide an item of fault information when the monitoring module detects a fault of the electric motor,
wherein the control module further controls the power supply module depending on the connection elements that the modular connector comprises.

2. The motor management device according to claim 1, wherein the modular connector comprises at least two connection element receiving locations, each location being able to accommodate all the types of connection elements.

3. The motor management device according to claim 1, wherein the electronic unit further comprises an identification module, connected to the modular connector, the identification module automatically identifying the number of connection elements that the modular connector comprises and the type of each connection element, and wherein the control module controls the power supply module depending on the number and type of the connection elements that the modular connector comprises.

4. The motor management device according to claim 3, wherein each connection element of the modular connector comprises electronic components for connecting the connection element to the electronic unit of the platform and wherein the identification module automatically identifies the type of each connection element based on the electronic components of the connection elements.

5. The motor management device according to claim 1, wherein the platform further comprises a communication module, configured to receive control instructions from an industrial computer, and to transmit operating information from the motor management device to the industrial computer, and wherein the control module controls the power supply module based on the control instructions received by the communication module.

6. The motor management device according to claim 1, wherein the motor management device is configured to be connected to a member for protecting the electric motor so as to obtain an item of information on the state of the protecting member, wherein the control module is further configured to control the power supply module based on the item of information on the state of the protecting member, and wherein the modular connector further comprises a connection element of state input type, configured to connect the protecting member to the control module.

7. The motor management device according to claim 1, wherein the modular connector further comprises a connection element of digital output type, configured to connect the control module to a digital control element of a switching member, and wherein the control module is configured to provide a digital control signal to the digital control element via the connection element of digital output type.

8. The motor management device according to claim 1, wherein the platform further comprises an auxiliary supply module, configured to be connected to an auxiliary power source and to supply auxiliary current to the motor management device, and wherein, preferably, the modular connector further comprises a connection element of auxiliary supply output type, configured to connect the auxiliary supply module to an auxiliary electrical load external to the motor management device.

9. The motor management device according to claim 1, wherein the platform further comprises an emergency stop module, connected to an emergency stop button, and wherein the emergency stop module disconnects the power supply of the power supply module when the emergency stop button is actuated.

10. A motor start-up and protection system comprising:
   a protecting member,
   at least one switching member, supplied with power by the protecting member, each switching member comprising a control element configured to switch the switching member between a closed state in which the switching member electrically powers an electric motor, and an open state in which the switching member does not electrically power the electric motor, and a motor management device, configured to supply control power to the control element of each switching member, wherein the motor management device is according to claim 1.

* * * * *